(No Model.)

S. W. FRANCE.
BOILER AND STEAMER.

No. 333,740.  Patented Jan. 5, 1886.

Witnesses:
C. V. Heljestrand
A. Grill

Inventor:
Simon W. France
by A. W. Almqvist
Attorney

UNITED STATES PATENT OFFICE.

SIMON W. FRANCE, OF BROOKLYN, NEW YORK.

BOILER AND STEAMER.

SPECIFICATION forming part of Letters Patent No. 333,740, dated January 5, 1886.

Application filed March 18, 1885. Serial No. 159,267. (No model.)

*To all whom it may concern:*

Be it known that I, SIMON W. FRANCE, a citizen of the United States, and resident of Brooklyn, in the county of Kings and State of New York, have invented certain new and useful Improvements in Boilers and Steamers, of which the following is a specification.

The object of my invention is to provide certain improvements in culinary vessels which will allow of boiling and steaming, respectively, two different substances simultaneously and without escape of the aromas, condensing the vapors and returning them to the boiler or collecting them separately, as may be desired.

Figure 1:
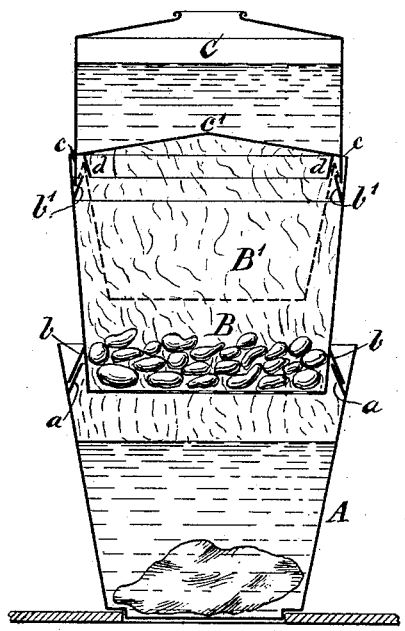
Figure 2:
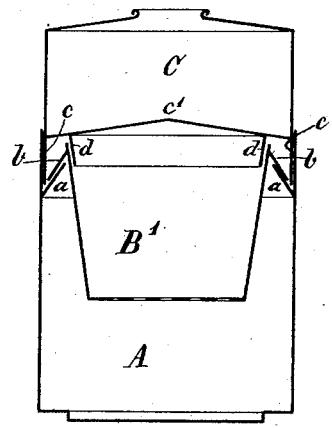
Figure 3:
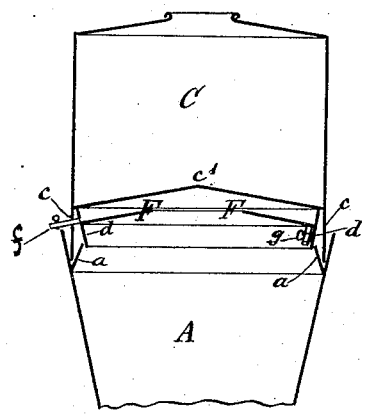
Figure 4:
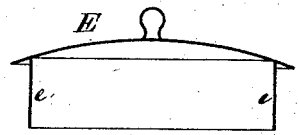

The invention will be hereinafter fully described, and specifically pointed out in the claims, reference being had to the accompanying drawings, in which—
Figure 1 represents a vertical central section of my improved culinary apparatus. Fig. 2 is a similar section showing a modification of the intermediate vessel of the same, whereby one liquid-joint is dispensed with. Fig. 3 is a section showing the means for collecting separately the condensed vapors. Fig. 4 is a section of a cover to replace the condenser for the purpose of retaining the heat when the boiling is completed.
A designates a cooking pot or boiler suitable to be heated over the fire in an ordinary stove, and provided at its periphery above the water-line with an inclined rim, $a$, forming an annular groove to be filled with water, so as to constitute a so-called "water-seal" or "liquid-joint" with a superjacent vessel, B, this latter having a circumferential downwardly-inclined rim, $b$, by which it is supported in the said groove upon the rim $a$, the weight of the vessel B tightening the conical rims $a\ b$ together. The vessel or boiler B has a perforated bottom, through which the steam from the boiler A rises for cooking substances in the vessel B separate from those placed in the boiler A. Thus are indicated in Fig. 1 a piece of beef boiling in the lower vessel, A, and potatoes cooking by the steam in B. The vessel B has on the inside a peripheral rim, $b'$, exactly like the rim $a$, for forming a water-groove and liquid-joint with the exterior rim of another superjacent vessel exactly similar to B, or with the deep peripheral rim $c$ of a vessel, C, which is supplied with cold water for condensing the steam and vapors rising to its radially-inclined or conical bottom $c'$. An annular rim, $d$, of smaller diameter than the rims $a$ and $b'$, projects downward from the bottom $c'$ of the condenser, for the purpose of leading the condensed vapors back to the subjacent vessel, and preventing them from flowing into the water-groove. The upper edges of the vessels A B stand considerably higher than the inner rims of the water-grooves, to prevent the water from being displaced by the ebullition, and thus prevent the aromas from escaping through the liquid-joints.

A series of successively-superjacent vessels having perforated bottoms, and intermediate to the boiler A and condenser C, may be used, for which purpose the outer rim, $b$, is arranged at the lower end, and the inner rim, $b'$, at the upper end of the vessel B, as in Fig. 1; but whether only one or several intermediate vessels are used, the one nearest to the condenser, for obvious reasons, does not need the inner rim, $b'$, and the outer rim, $b$, is then preferably arranged at the upper end of the vessel, as shown in Fig. 2, and in dotted lines in Fig. 1, and designated by the letter B'.

In combination with the boiler and condenser I provide a cover, E, (see Fig. 4,) having a deep rim, $e$, to form a liquid-joint with the water-groove of the boiler, and which cover is used to replace the condenser for retaining the heat as well as the aromas when the cooking has been completed.

For the purpose of collecting the condensed vapors outside the vessel—for instance, as when desired to distill impure drinking-water in a house—the bottom rim, $d$, of the condenser C is provided with an inner rim, F, or plate, open in the center, which rim F is inclining outward, thus forming between the bottom $c'$ and plate F a chamber in which the condensed vapors collect, and are drawn off by means of the laterally-projecting discharge-pipe $f$, (see Fig. 3,) the similar downwardly-projecting pipe $g$ being used (and the pipe $f$ shut off) when it is desired to return the condensed vapors to the boiler below.

I am aware that a liquid-joint, *per se*, is old in cooking-vessels, an instance of which may be seen in Patent No. 51,741, for coffee-percolators. I am also aware that a condenser superjacent upon a boiler or cooking-pot is old, an instance thereof being shown in Patent No. 28,325. I therefore do not claim, broadly, either a condenser or a liquid-joint as applied to culinary vessels; nor do I claim the specific construction thereof shown in Patent No. 76,231.

Having thus described my invention, I claim as new and desire to secure by Letters Patent—

1. The combination of a boiler having annular water-groove with a condenser having peripheral downwardly-projecting rim fitting said groove, and a projecting rim within the outer rim for returning the condensed vapors to the boiler, substantially as and for the purpose set forth.

2. The combination of the boiler A, having rim $a$, forming a peripheral water-groove, the condenser provided with the two rims $c$ $d$, and the intermediate vessel having perforated bottom and exterior rim, $b$, all constructed substantially as and for the purpose set forth.

3. In combination with a boiler, the condenser C, provided with the bottom rim, $d$, having the inner flange, F, and above the flange a lateral discharge, $f$, the said flange also having a downward discharge, $g$, substantially as and for the purpose set forth.

In testimony that I claim the foregoing as my invention I have signed my name, in presence of two witnesses, this 12th day of March, 1885.

S. W. FRANCE.

Witnesses:
A. W. ALMQVIST,
A. WAHLBERG.